United States Patent
Li

(10) Patent No.: US 9,983,939 B2
(45) Date of Patent: May 29, 2018

(54) FIRST-FAILURE DATA CAPTURE DURING LOCKSTEP PROCESSOR INITIALIZATION

(71) Applicant: International Business Machines Corporation, Armonk, NY (US)

(72) Inventor: Ying-Yeung Li, Pleasant Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 59 days.

(21) Appl. No.: 15/278,180

(22) Filed: Sep. 28, 2016

(65) Prior Publication Data

US 2018/0089032 A1    Mar. 29, 2018

(51) Int. Cl.
*G06F 11/14*    (2006.01)

(52) U.S. Cl.
CPC ...... *G06F 11/1441* (2013.01); *G06F 11/1474* (2013.01); *G06F 2201/805* (2013.01); *G06F 2201/82* (2013.01); *G06F 2201/825* (2013.01); *G06F 2201/85* (2013.01)

(58) Field of Classification Search
CPC ............ G06F 11/1641; G06F 11/1683; G06F 11/1645; G06F 11/1658
See application file for complete search history.

(56) References Cited

U.S. PATENT DOCUMENTS

| | | | |
|---|---|---|---|
| 6,948,092 B2* | 9/2005 | Kondo | G06F 11/1441 714/12 |
| 7,017,073 B2 | 3/2006 | Nair et al. | |
| 7,290,169 B2 | 10/2007 | Safford et al. | |
| 2010/0318746 A1* | 12/2010 | Troxel | G06F 11/1438 711/141 |
| 2015/0143181 A1 | 5/2015 | Xiao et al. | |
| 2017/0083391 A1* | 3/2017 | Robertson | G06F 11/079 |

* cited by examiner

*Primary Examiner* — Jigar Patel
(74) *Attorney, Agent, or Firm* — Cantor Colburn LLP; Margaret A. McNamara

(57) ABSTRACT

Techniques are provided for performing automated operations to enable first-failure data capture functionality during initialization of multiple lockstep processors. Following a hardware reset of two lockstep processors, an indication is received of one or more crosscheck errors regarding the operation of the two lockstep processors. In response to the crosscheck errors, crosscheck first-failure data capture (FFDC) data is saved to one or more memory areas that are persistent across a hardware reset, and it is determined whether a predefined reset threshold has been satisfied. Responsive to determining that the predefined reset threshold has been satisfied, the crosscheck FFDC data from the one or more persistent memory areas is analyzed and one or more crosscheck initialization codes are responsively generated. An additional hardware reset is initiated.

20 Claims, 2 Drawing Sheets

US 9,983,939 B2

FIRST-FAILURE DATA CAPTURE DURING LOCKSTEP PROCESSOR INITIALIZATION

BACKGROUND

One technique that has been used to protect arbitrary control logic and associated execution data paths is to execute the same instruction stream on two or more processors in parallel. Such processors are said to execute two copies of the instruction stream "in lockstep," and therefore are referred to as "lockstep processors." This disclosure relates to a method of synchronizing cross-checked lockstep processors.

A "multi-core" processor may include one or more processor cores on a single chip. A multi-core processor behaves as if it were multiple processors. Each of the multiple processor cores may essentially operate independently, while sharing certain common resources, such as a cache or system interface. In some existing systems, multiple cores within a single microprocessor may operate as lockstep processors.

Generally, two or more lockstep processor cores execute the same instruction for security, backup, and data integrity purposes. However, the processing functions of such lockstep processors typically diverge during the post-reset initialization process because the processor cores are not yet fully synchronized. In order for such initial synchronization to occur, each core must be initialized, such as by executing various routines to force such synchronization.

Once the post-reset initialization process is completed without crosschecking errors, normal post-reset crosschecking—and its associated locking mechanism—may be initiated. However, during the time of incremental synchronization (i.e., before the post-reset locking mechanism can be enabled) it is very difficult to capture the first instance of an error.

SUMMARY

According to at least one embodiment, a method for providing first-failure data capture functionality during initialization of multiple lockstep processors is provided. The method comprises receiving, after a hardware reset of two lockstep processors, an indication of one or more crosscheck errors regarding the operation of the two lockstep processors. The method further comprises, in response to the one or more crosscheck errors, saving crosscheck first-failure data capture (FFDC) data to one or more memory areas that are persistent across a hardware reset, and determining whether a predefined reset threshold has been satisfied. The method further comprises, responsive to determining that the predefined reset threshold has been satisfied, analyzing the crosscheck FFDC data from the one or more persistent memory areas and, based on the analyzing of the crosscheck FFDC data, generating one or more crosscheck initialization codes. The method further comprises initiating an additional hardware reset.

According to another embodiment, a system for providing first-failure data capture functionality during initialization of multiple lockstep processors is provided. The system comprises two lockstep processors and glue logic for the two lockstep processors, wherein the glue logic for the two lockstep processors causes the system to perform a method. The performed method includes receiving, after a hardware reset of the two lockstep processors, an indication of one or more crosscheck errors regarding the operation of the two lockstep processors. The method further includes, in response to the one or more crosscheck errors, saving crosscheck first-failure data capture (FFDC) data to one or more memory areas that are persistent across a hardware reset, and determining whether a predefined reset threshold has been satisfied. The method further includes, responsive to determining that the predefined reset threshold has been satisfied, analyzing the crosscheck FFDC data from the one or more persistent memory areas and, based on the analyzing of the crosscheck FFDC data, generating one or more crosscheck initialization codes. The method further includes initiating an additional hardware reset.

According to another embodiment, a computer program product is provided comprising a computer-readable storage medium having program instructions embodied therewith, such that the program instructions are executable by a processing circuit to cause the processing circuit to perform a method for providing first-failure data capture functionality during initialization of multiple lockstep processors. The processing circuit may be provided, for example, as part of a larger plurality of processing circuits included within a controller that can be configured to execute the method based on program instructions that establish configuration, layout, timing, and/or other functional characteristics of the controller as parallel and/or sequential operations. The performed method includes receiving, after a hardware reset of the two lockstep processors, an indication of one or more crosscheck errors regarding the operation of the two lockstep processors. The method further includes, in response to the one or more crosscheck errors, saving crosscheck first-failure data capture (FFDC) data to one or more memory areas that are persistent across a hardware reset, and determining whether a predefined reset threshold has been satisfied. The method further includes, responsive to determining that the predefined reset threshold has been satisfied, analyzing the crosscheck FFDC data from the one or more persistent memory areas and, based on the analyzing of the crosscheck FFDC data, generating one or more crosscheck initialization codes. The method further includes initiating an additional hardware reset.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION

Techniques are described herein to determine the origin of the first crosschecks error i.e. capture first-failure data capture (FFDC) during the incremental reset process for two or more lockstep processor cores. The method includes glue logic for the processor cores that may be cleared and enabled by firmware, such that subsequent resets will be armed to capture any crosschecking failure. In this manner, new and/or additional crosscheck initialization codes may be generated by the glue logic in order to capture FFDC data and compensate for any failures or other errors detected thereby. The cross-checked FFDC glue logic will lock upon encountering the first crosscheck error, and trigger any associated trap registers.

It will be appreciated that, as used herein, the terms "processor" and "processor core" are utilized interchangeably unless the context clearly indicates otherwise.

Figure 1:
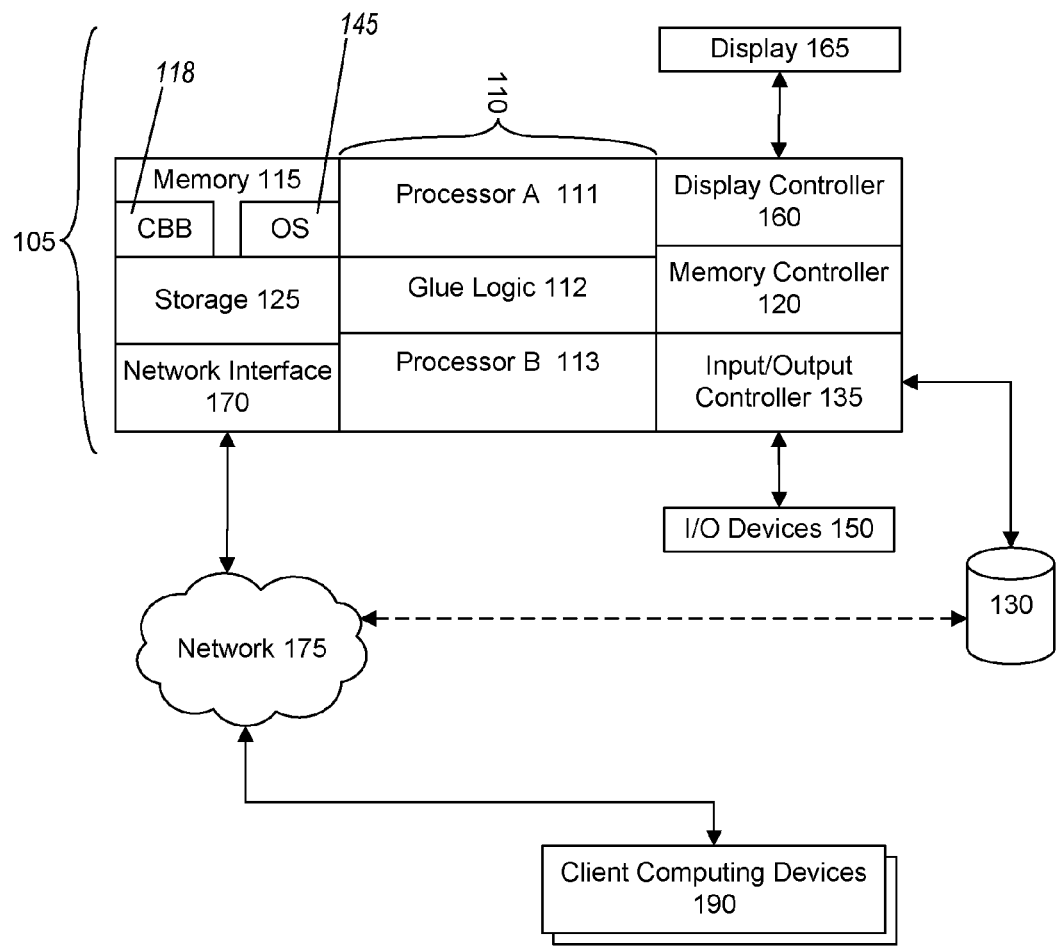
FIG. 1 depicts a block diagram of an exemplary network environment and computing system in accordance with an embodiment of one or more techniques described herein.

FIG. 1 illustrates a block diagram of a networked computing system 100 for use in practicing the teachings herein. In an exemplary embodiment, the methods described herein are implemented in hardware, and may be part of a multi-core microprocessor of a special or general-purpose digital computer, such as a personal computer, workstation, minicomputer, or mainframe computer. The computing system 100 therefore includes computer 105.

In the illustrated embodiment of FIG. 1, the computer 105 includes a multi-core processor that comprises a first lockstep processor core Processor A 111, a second lockstep processor core Processor B 113, and glue logic 112 interfacing the two processor cores. The computer 105 further includes a memory 115 coupled to a memory controller 120, internal storage 125, and one or more input and/or output (I/O) devices 150 that are communicatively coupled to the computer 105 via a local input/output controller 135, which in the illustrated embodiment is further communicatively coupled to external storage 130. The input/output controller 135 may include one or more buses or other wired or wireless connections, as is known in the art. The input/output controller 135 may further include additional elements, which are omitted for simplicity, such as controllers, buffers (caches), drivers, repeaters, and receivers, to facilitate communications. Further, the local interface may include address, control, and/or data connections to facilitate appropriate communications among the aforementioned components.

In the illustrated embodiment, the multi-core processor 110 is a hardware device for executing hardware instructions or software, particularly that stored in memory 115. The multi-core processor 110 can be any custom made or commercially available processor, a central processing unit (CPU), an auxiliary processor among several processors associated with the computer 105, a semiconductor based microprocessor (in the form of a microchip or chip set), a macroprocessor, or generally any device for executing instructions. In addition, the computer 105 may include one or more additional controllers (not shown), such as a controller including one or more processing circuits that can be configured to execute techniques described herein based on program instructions that establish configuration, layout, timing, and/or other functional characteristics of the controller as parallel and/or sequential operations.

The memory 115 can include any one or combination of volatile memory elements (e.g., random-access memory (RAM, such as dynamic random-access memory or "DRAM", SRAM, synchronous dynamic random-access memory or "SDRAM", etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 115 may incorporate electronic, magnetic, optical, and/or other types of storage media. Note that the memory 115 can have a distributed architecture, where various components are situated remote from one another, but can be accessed by the multi-core processor 110.

In the illustrated embodiment of FIG. 1, the memory 115 includes a control buffer block (CBB) 118 comprising one or more blocks of non-volatile memory, such as non-volatile SDRAM and/or embedded DRAM (eDRAM), in which various data may persist through one or more reset operations for the lockstep processor cores of multi-core processor 110 (i.e., for Processor A 111 and Processor B 113). For example, FFDC data may be stored in the CBB 118 when a crosscheck error is encountered, with such FFDC data being analyzed in order to generate one or more crosscheck initialization codes for purposes of initiating one or more recent routines following the next hardware reset.

The instructions in the memory 115 may additionally include one or more separate programs, each of which comprises an ordered listing of executable instructions for implementing logical functions. In the example of FIG. 1, the instructions in the memory 115 include a suitable operating system (OS) 145. The operating system 145 typically controls the execution of other computer programs and may, among other capabilities, provide scheduling, input-output control, file and data management, memory management, and communication control and related services.

In an exemplary embodiment, I/O devices 150 may include, as non-limiting examples, a keyboard, mouse, printer, scanner, microphone, a network interface card (NIC) or modulator/demodulator (for accessing other files, devices, systems, or a network), a radio frequency (RF) or other transceiver, a telephonic interface, a bridge, a router, and other peripherals communicatively coupled to the computer 105 via input/output controller 135. In the depicted embodiment, the computing system 100 further includes a display controller 160 coupled to a display 165, and a network interface 170 communicatively coupled to a network 175. In the depicted embodiment, one or more client computing devices 190 are communicatively coupled to the network 175, such as client computing devices associated with users who send or receive particular communications to and from the computer 105 in order to receive one or more services and/or information from the computer 105.

The network 175 may be an IP-based network for communication between computer 105 and any external server, client and the like via a broadband or other network connection. The network 175 transmits and receives data between the computer 105 and external systems. In an exemplary embodiment, the network 175 may be a managed IP network administered by a service provider. The network 175 may be implemented in a wireless fashion, e.g., using wireless protocols and technologies, such as WiFi, WiMax, etc. The network 175 may also be a packet-switched network such as a local area network, wide area network, metropolitan area network, Internet network, or other similar type of network environment. The network 175 may be a fixed wireless network, a wireless local area network (LAN), a wireless wide area network (WAN) a personal area network (PAN), a virtual private network (VPN), intranet or other suitable network system and includes equipment for receiving and transmitting signals.

In at least some embodiments, the memory 115 may further include a basic input output system (BIOS) (omitted for simplicity). The BIOS is a set of routines that initialize and test hardware at startup, initiate execution of the OS 145, and support the transfer of data among the hardware devices. The BIOS is typically stored in ROM so that the BIOS may be executed when the computer 105 is activated. When the computer 105 is in operation, the multi-core processor 110 is configured to execute instructions stored within the memory 115, to communicate data to and from the memory 115, and to generally control operations of the computer 105 pursuant to the instructions.

Figure 2:
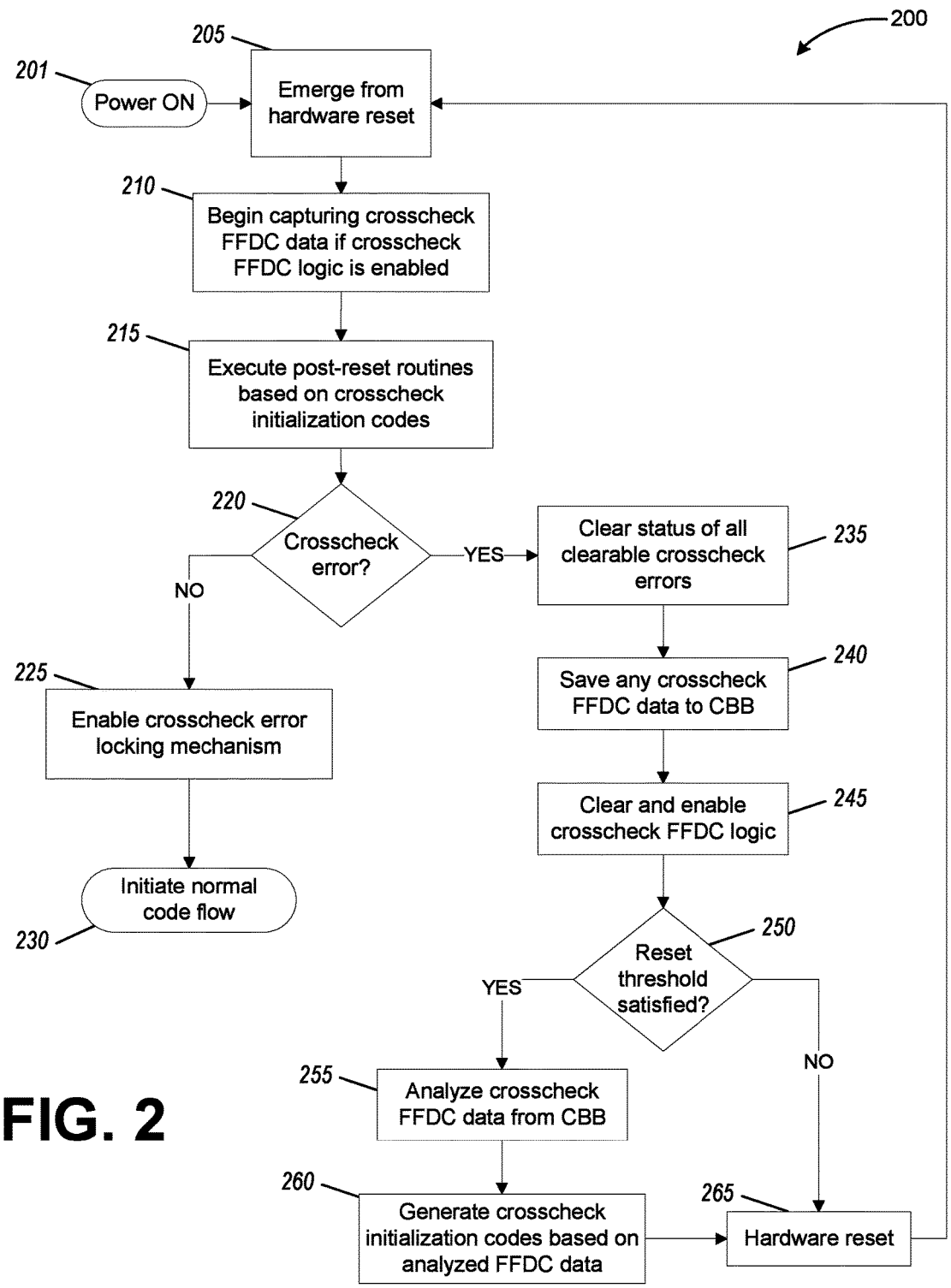
FIG. 2 depicts a process flow for capturing and analyzing FFDC data, as well as adjusting post-reset routines based on the analysis of such data in accordance with an embodiment of one or more techniques described herein.

FIG. 2 depicts a process flow 200 for capturing and analyzing FFDC data during initial power on or reset of multiple lockstep processor cores, as well as adjusting post-reset routines based on the analysis of such data. The routine begins at block 201, in which a computing system (such as computer 105 of FIG. 1) is initially powered on. At block 205, the lockstep processor cores emerge from hardware reset. It will be appreciated that in certain scenarios and embodiments, some of which are described elsewhere herein, the lockstep processor cores may emerge from hardware reset in circumstances other than immediately following a system power on operation.

At block 210, the routine begins capturing crosscheck FFDC data if, and only if, the crosscheck FFDC logic has been enabled. Typically, such FFDC logic to capture crosscheck FFDC data will not have been enabled immediately following a power on operation. However, as described in greater detail below, such logic may be enabled following a self-reset operation.

The routine proceeds to block 215, in which one or more post-reset routines are executed responsive to crosscheck initialization codes, such as may be stored in a control block buffer or other area of non-volatile memory. The recent routines are executed in order to initialize each lockstep processor core in order to force processing to occur identically in each. As one example, one or more initialization code may indicate that one or more registers for each processor may need to be initialized (e.g., set or cleared).

In certain embodiments, a default set of crosscheck initialization codes may be stored as part of the glue logic interface between the multiple lockstep processor cores, may be stored as part of the processor firmware, etc. As another example, a previous reset operation may have resulted in additional crosscheck initialization codes being generated and stored, as described below.

At block 220, the routine determines whether one or more crosscheck errors have occurred subsequent to emerging from the hardware reset of block 210. If no such crosscheck errors have occurred, the routine proceeds to block 225 in order to enable one or more crosscheck error locking mechanisms employed during normal processing operations, and then to block 230 to initiate normal code flow, such as the loading of an operating system, system drivers, and applications.

If in block 220 one or more crosscheck errors were determined to have occurred subsequent to emerging from the hardware reset of block 210, the routine proceeds to block 235, in which it clears the status of all clearable crosscheck errors. The routine then proceeds to block 240, in which any crosscheck FFDC data is saved to the control block buffer. Such data will be available, for example, if crosscheck FFDC logic has been enabled subsequent to a previous hardware reset. An example of such enablement appears at block 245, in which the routine clears previous FFDC data and enables crosscheck FFDC logic in order to capture crosscheck FFDC data with respect to the next reset operation. As noted above, while FFDC logic to capture crosscheck FFDC data will not generally have been enabled immediately following a power on operation, the routine ensures that such logic is enabled following a self-reset operation. Typically, enabling the crosscheck FFDC logic may be accomplished by setting and/or clearing an appropriate register, or in some other appropriate manner.

At block 250, the routine determines whether a reset threshold has been satisfied. As one example, the routine may be configured (such as via glue logic 112 of FIG. 1) to determine whether the lockstep processor cores have emerged from hardware reset more than twenty times in succession since the power on operation of block 205. Whatever threshold is specified, if the routine determines that such threshold has been satisfied, in block 255 the crosscheck FFDC data stored within the control block buffer is analyzed. By analyzing the crosscheck FFDC data, for example, the first instance of a mismatch in processing operations between the lockstep processor cores may be determined. Such information may be used to determine additional post-reset routines that may be initiated post-reset in order to avoid such mismatch during the next reset cycle.

In block 260, crosscheck initialization codes are generated based on analyzing the stored FFDC data. In certain embodiments, each initialization code corresponds to a particular post-reset routine or operation to be executed during the next reset cycle. In other embodiments, initialization codes may not directly correspond to such operations, but a combination of such initialization codes may indicate particular post-reset routines or operations. In one or more embodiments, the routine may incrementally generate additional crosscheck initialization codes as needed based on such analysis. In other embodiments, a full set of initialization codes may be generated based on such analysis after each reset cycle.

After the crosscheck initialization codes have been generated in block 260, or if it was determined in block 250 that the reset threshold had not been satisfied, in block 265 a hardware reset of the lockstep processor cores is initiated. In at least some embodiments, initiating the hardware reset includes incrementing a counter to be checked against the reset threshold during the next reset cycle. Once reset has occurred, the routine returns to block 205 in order to emerge from the hardware reset and begin the next reset cycle. In certain embodiments, the hardware reset of block 265 may include a complete power cycle of the computing system, such that block 201 again occurs prior to the hardware reset of block 205.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that in some embodiments the functionality provided by the routine or routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that particular data structures discussed above may be structured in different manners, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for providing first-failure data capture functionality during initialization of multiple lockstep processors, the method comprising:
   receiving, after a hardware reset of two lockstep processors, an indication of one or more crosscheck errors regarding operation of the two lockstep processors;
   in response to the one or more crosscheck errors:
      saving crosscheck first-failure data capture (FFDC) data to one or more memory areas that are persistent across a hardware reset; and
      determining whether a predefined reset threshold has been satisfied;
   responsive to determining that the predefined reset threshold has been satisfied, analyzing the crosscheck FFDC data from the one or more persistent memory areas and, based on the analyzing of the crosscheck FFDC data, generating one or more crosscheck initialization codes; and
   initiating an additional hardware reset.

2. The method of claim 1 wherein the method further comprises, after emerging from the additional hardware reset, executing one or more post-reset routines based on the generated crosscheck initialization codes.

3. The method of claim 1 wherein the method further comprises emerging from the additional hardware reset, determining that no crosscheck errors regarding operation of the two lockstep processors have occurred after emerging from the additional hardware reset, and enabling one or more crosscheck error locking mechanisms.

4. The method of claim 1 wherein the method is additionally performed for one or more subsequent iterations, such that additional crosscheck initialization codes are generated during each of the one or more subsequent iterations.

5. The method of claim 1 wherein the method is additionally performed for one or more subsequent iterations, such that a distinct set of post-reset routines is executed based on the crosscheck initialization codes during each of the one or more subsequent iterations.

6. The method of claim 1 wherein saving the crosscheck FFDC data to one or more persistent memory areas includes saving the crosscheck FFDC data to synchronous dynamic random-access memory (SDRAM).

7. The method of claim 1 wherein saving the crosscheck FFDC data to one or more persistent memory areas includes saving the crosscheck FFDC data to embedded DRAM (eDRAM).

8. The method of claim 1 wherein saving the crosscheck FFDC data to one or more persistent memory areas includes saving the crosscheck FFDC data to a control block buffer.

9. The method of claim 1 wherein the method further comprises, in response to the one or more crosscheck errors, clearing a status of at least one of the one or more crosscheck errors.

10. The method of claim 1 wherein determining whether the predefined reset threshold has been satisfied includes comparing the predefined reset threshold to a counter, and wherein initiating the additional hardware reset includes incrementing the counter.

11. A system for providing first-failure data capture functionality during initialization of multiple lockstep processors, the system comprising:
   two lockstep processors; and
   glue logic for the two lockstep processors, wherein the glue logic for the two lockstep processors causes the system to perform a method that includes:
   receiving, after a hardware reset of the two lockstep processors, an indication of one or more crosscheck errors regarding operation of the two lockstep processors;
   in response to the one or more crosscheck errors:
      saving crosscheck first-failure data capture (FFDC) data to one or more memory areas that are persistent across a hardware reset; and
      determining whether a predefined reset threshold has been satisfied;
   responsive to determining that the predefined reset threshold has been satisfied, analyzing the crosscheck FFDC data from the one or more persistent memory areas and, based on the analyzing of the crosscheck FFDC data, generating one or more crosscheck initialization codes; and
   initiating an additional hardware reset.

12. The system of claim 11 wherein the method further comprises, after emerging from the additional hardware reset, executing one or more post-reset routines based on the generated crosscheck initialization codes.

13. The system of claim 11 wherein the method further comprises emerging from the additional hardware reset, determining that no crosscheck errors regarding operation of the two lockstep processors have occurred after emerging from the additional hardware reset, and enabling one or more crosscheck error locking mechanisms.

14. The system of claim 11 wherein the method is additionally performed for one or more subsequent iterations, such that additional crosscheck initialization codes are generated during each of the one or more subsequent iterations.

15. The system of claim 11 wherein the method is additionally performed for one or more subsequent iterations, such that a distinct set of post-reset routines is executed based on the crosscheck initialization codes during each of the one or more subsequent iterations.

16. The system of claim 11 wherein saving the crosscheck FFDC data to one or more persistent memory areas includes saving the crosscheck FFDC data to SDRAM.

17. The system of claim 11 wherein saving the crosscheck FFDC data to one or more persistent memory areas includes saving the crosscheck FFDC data to embedded DRAM (eDRAM).

18. The system of claim 11 wherein saving the crosscheck FFDC data to one or more persistent memory areas includes saving the crosscheck FFDC data to a control block buffer.

19. The system of claim 11 wherein the method further comprises, in response to the one or more crosscheck errors, clearing a status of at least one of the one or more crosscheck errors.

20. A computer program product comprising a computer-readable storage medium having program instructions embodied therewith, the program instructions executable by a processing circuit to cause the processing circuit to perform:
   receiving, after a hardware reset of two lockstep processors, an indication of one or more crosscheck errors regarding operation of the two lockstep processors;
   in response to the one or more crosscheck errors:
      saving crosscheck first-failure data capture (FFDC) data to one or more memory areas that are persistent across a hardware reset; and determining whether a predefined reset threshold has been satisfied;

responsive to determining that the predefined reset threshold has been satisfied, analyzing the crosscheck FFDC data from the one or more persistent memory areas and, based on the analyzing of the crosscheck FFDC data, generating one or more crosscheck initialization codes; and initiating an additional hardware reset.

* * * * *